United States Patent Office 3,294,848
Patented Dec. 27, 1966

3,294,848
SURFACE ACTIVE AGENTS FROM ORGANOMETALLIC COMPOUNDS UTILIZING A FRIEDEL-CRAFTS CATALYST
Mason H. Earing, Grosse Ile, and John T. Patton, Jr., Wyandotte, Mich., assignors to Wyandotte Chemicals Corporation, Wyandotte, Mich., a corporation of Michigan
No Drawing. Filed Aug. 5, 1963, Ser. No. 300,084
19 Claims. (Cl. 260—615)

The present invention relates to surface active agents, and is more particularly concerned with the production of non-ionic surface active agents from metal alkyls.

The molecules of nonionic surface active agents, in general, consist of two parts or moieties: a hydrophobic water-insoluble portion and a hydrophilic water-soluble portion. Compounds wherein the hydrophobic water-insoluble moiety of the molecule is a higher-alkyl radical and the hydrophilic or water-soluble moiety is a polyoxyalkylene radical are well known and widely used in the art as surface active agents having excellent surface-active properties for many applications. The structure of such compounds may be represented by the following formula:

$$(R)-(O-R'-)_m OH \quad \text{(I)}$$
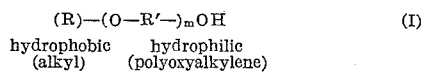

wherein R is a higher-alkyl or aralkyl radical, R' is a lower-alkylene radical, and $m$ is an integer.

In the past, such surface active agents have been prepared by various processes involving less than optimum economic considerations, as by the preparation and isolation of a higher alcohol and subsequent reaction of the alcohol with an alkylene oxide. Such processes are quite involved and require expensive starting reactants. It is therefore apparent that it would be highly desirable to have available a readily reproducible and economical process for the production of such compounds.

It is an object of the present invention to provide a novel method for the production of nonionic surface active agents. Another object is to provide a novel method for the production of surface active agents comprising an alkyl group and a polyoxyalkylene chain. An additional object is to provide a method of producing such surface active agents from relatively inexpensive materials. A still further object is to provide a method of preparing such surface active agents by means of organometallic compounds. Additional objects will be apparent to one skilled in the art and still other objects will become apparent hereinafter.

According to the invention, a metal alkyl compound is prepared by reacting an alkenyl compound with a combined hydride of aluminum and a metal from Group I of the Periodic Table, preferably in an organic solvent substantially inert to the reaction. A small amount of aluminum chloride is added to the reaction mixture, and subsequently an alkylene oxide such as ethylene oxide is introduced into the reaction vessel and added to the metal alkyl compound. The resulting addition product is ultimately converted to the desired surface active agent shown in Formula I above by hydrolysis.

The surface active agents which are the products of the present invention are low molecular weight polymers wherein from 2 to 20 and preferably from 3 to 10 alkylene oxide units, e.g., ethylene oxide units form the longest chain. These products are obtained by reacting the desired molar ratios of alkylene oxide and metal alkyl in the presence of aluminum chloride. In contrast, when aluminum chloride is not utilized, even though the same ratios of reactants are employed, the products are high molecular weight polymers wherein about 500 or more alkylene oxide units have combined to form a single chain.

Such products are not suitable as surface active agents, even after hydrolysis to remove the metal.

Although the Group I metal-aluminum tetraalkyl may be prepared by any process known in the art, the preferred method is to react the α-olefin corresponding to the desired alkyl radical with a Group I metal-aluminum hydride, preferably in the presence of a suitable solvent inert to the reaction.

The reaction for preparing the metal alkyl compound may be illustrated by the following equation:

$$MAlH_4 + 4R-CH=CH_2 \rightarrow MAl(CH_2CH_2R)_4 \quad \text{(II)}$$

wherein M is a metal from Group I of the Periodic Table, and R is an alkyl radical having at least 2 carbon atoms. Lithium is the preferred Group I metal, although others such as sodium and potassium may be used.

In carrying out the present process, aluminum chloride is added to the tetraalkyl compound (II) shown above. This addition causes a reaction to take place with the tetraalkyl, the precise nature of which is not presently known. If desired, addition of the alkylene oxide may begin immediately upon the addition of the aluminum chloride. However, it has been found highly desirable to permit the aluminum chloride to react with the alkyl compound for a short period as, for example, one-half hour. The alkylene oxide addition takes place more smoothly, and more oxide is added if the aluminum chloride is first permitted to react as described. A sufficient amount of the aluminum chloride catalyst should be utilized so that an excess remains for the purpose of promoting the reaction when an alkylene oxide is subsequently added thereto. Generally, an amount from about 0.01% by weight up to an amount equal to a 1:1 mole ratio with respect to the Group I metal aluminum hydride employed in the prior step of the invention is satisfactory. If necessary, additional catalyst may be added immediately prior to reaction with the alkylene oxide. The reaction with the alkylene oxide may be shown by the following equation, in which ethylene xoide is chosen as the alkylene oxide and lithium as the Group I metal:

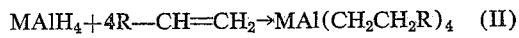

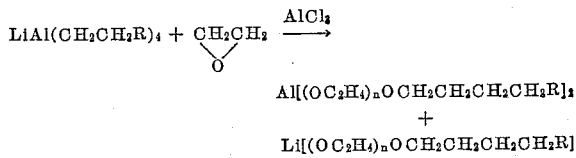

The reaction product is then hydrolyzed as by means of a suitable acid to yield the surface active agent having the general Formula I shown above.

The alkyl radicals of the organometallic compounds may be straight, branched, or cyclic alkyl or aralkyl, and have at least 4 and preferably 8 carbon atoms and up to 24 carbon atoms, such as butyl, isobutyl, n-pentyl, 1-methylbutyl, 1-ethylpropyl, 1,2-dimethylpropyl, hexyl, heptyl, octyl, decyl, dodecyl, hexadecyl, 1-decyldodecyl, cyclohexyl, cyclopentyl, methylcyclohexyl, 1-decyl - 9-methyldodecyl, benzyl, phenethyl, phenpropyl, 4-phenylnonyl, 10-phenylundecyl, and the like.

The organometallic compounds may be prepared by reacting the Group I metal-aluminum hydride with the α-olefin corresponding to the desired alkyl radical. For example, to prepare an organometallic compound containing dodecyl radicals, 1-dodecene would be utilized as the olefin. Among other representative olefins which may be used are styrene, 3-phenylpropene-1, 4-phenylnonene-1, 10-phenylundecene-1, cyclohexene, et cetera. A particularly useful and readily available material is Blend 4A, a mixture of α-olefins having an average molecular weight of 200.4, marketed by Atlantic Refining Company.

The α-olefins used in the present invention should have from four to about twenty-four carbon atoms, and preferably at least 8 carbon atoms.

The lower-alkylene oxides employed in the present invention are those having from two to four carbon atoms which are capable of condensing with alkyl groups and further polymerizing to form water-solubilizing moieties. Preferred compounds are those which have from two to three carbons, such as ethylene oxide and propylene oxide. A sufficient amount of alkylene oxide should be introduced into the reaction so that a water-soluble addition product results. It is preferred that an amount be added which is sufficient to form a polyoxyethylene or other polyoxyalkylene chain having a molecular weight approximately equal to that of the higher alkyl group introduced by the metal alkyl. The alkylene oxide addition step may be carried out according to conventional methods, e.g., at a temperature of about 0° to about 200° C. and preferably about 80° to about 150° C.

The products of the addition of ethylene oxide or other alkylene oxides to the higher metal alkyls are metal alcoholates having polyoxyalkylene, e.g., polyoxyethylene, chains which terminate in alkyl groups. These products are readily hydrolyzed to produce the desired surface active agents. The hydrolysis step may be carried out by treating the metal addition product with water in the presence of an acid, e.g., phosphoric, sulfuric, hydrochloric, or the like. Mineral acids are preferred, although numerous organic acids may also be employed, as well as compounds which form acids in situ under the conditions of reaction, e.g., acetyl chloride, thionyl bromide or the like. Preferably, the acid is so selected as to be capable of precipitating the metal from solution in the form of a salt, for example, aluminum phosphate.

In its basic aspect, the present invention utilizes starting materials such as aluminum, lithium, hydrogen, ethylene oxide and ethylene or a higher olefin to produce inexpensive nonionic surface active agents.

Many methods of purification of nonionic surface-active agents are known and may be employed to purify the products. Filtration and stripping of volatile impurities under reduced pressure are exemplary of such purification procedures which may be employed.

It is well known in the field of alkylene oxide chemistry that, when a reactive hydrogen compound is subjected to oxyalkylation, a compound is produced which is in fact a polymer of the alkylene oxide having the reactive hydrogen compound as a terminal group. Further, when a large proportion of alkylene oxide to reactive hydrogen compound is used, the reaction product is not a single molecular compound having a defined number of oxyalkylene radicals but, rather, a mixture of closely related or touching or adjacent homologs wherein the statistical average number of oxyalkylene groups equals the relative number of moles of the alkylene oxide employed, and the individual members present in the mixture contain varying numbers of polyoxyethylene groups. Thus, the compositions of this invention are mixtures of compounds which may be defined in terms of molecular weight and weight percent. For convenience in referring to such products as are produced by the process of the present invention, the term "cogeneric mixture" is employed. This term has been coined to designate the mixture of a series of closely related homologs that are obtained by condensing a plurality of alkylene oxide units with a reactive hydrogen compound. The term is defined in greater detail in U.S. Patent 2,549,438.

Various types of products may be obtained in utilizing the process of the present invention by appropriately selecting the reactants and reaction conditions. For example, when a single alkylene oxide, such as ethylene oxide, is reacted with a metal alkyl, the resulting molecules have a structure in the form of a chain comprised of oxyethylene segments terminated by the metal alkyl.

When two or more different alkylene oxides are utilized, such as ethylene oxide and propylene oxide, the structure of the molecules formed may be one of several different types depending upon the nature of the process used. Where both alkylene oxides are mixed together and simultaneously reacted with the metal alkyl, the resulting product has a structure that is commonly termed a "heteric" structure, that is, a structure in which the different individual alkylene oxide radicals are randomly distributed throughout the polyoxyalkylene portion of the molecular chain. Alternatively, when a sequential procedure is employed and one of the alkylene oxides is first reacted with the metal alkyl, and the other subsequently added and reacted, a molecular structure is formed which is commonly known as the "block" or "conjugated" type. In this structure the molecular chain is comprised of a polymerized segment of one alkylene oxide connected to a polymerized segment of the other alkylene oxide, thus providing a conjugated or repeated unit structure. Whether the chain comprises ethylene oxide alone or a mixture of ethylene oxide and other oxides, the oxygen/carbon atom ratio of the chain must be at least 0.40. The hydrophilic polyoxyalkylene chain should constitute 5% to 90% by weight of the product for a surface active agent, and at least 40% by weight for a detergent.

The following examples are given by way of illustration only and are not to be construed as limiting.

*Example 1.—Preparation of surface active agent*

A solution of 6 grams (.16 mole) of lithium aluminum hydride and 84 grams (0.5 mole) of 1-dodecene in 100 milliliters of xylene was heated to a temperature of 100° to 130° C. over a period of 6.5 hours. At the end of that period one gram of aluminum chloride was added at the reaction temperature and permitted to react for about one-half hour. Ethylene oxide was then introduced at a temperature of 60°–140° C. into the reaction mixture until about 28.5 grams (.65 mole) had been added. The resulting product was treated with phosphoric acid, steam distilled for one hour, filtered, dissolved in methanol, refiltered, and stripped of volatile impurities under reduced pressure. The resulting product comprised 71 grams of a surface-active agent having a molecular weight of 448. When tested by the standard DuNöuy tests, the product reduced the surface tension of water to 29 dynes per centimeter.

*Example 2.—Comparison example*

An amount of 13.3 grams of aluminum ethyl and 50 grams of 1-dodecene were reacted together to form aluminum tridodecene. One hundred milliliters of xylene containing 0.5 gram aluminum chloride were then added to the aluminum tridodecene. Ethylene oxide was then introduced into the mixture until 27 grams of ethylene oxide had reacted. The liquid phase was separated from the solid and neutralized with phosphoric acid. The mixture containing precipitated aluminum phosphate was then steam-distilled to remove excess reactants and solvents. The precipitated salts were removed by filtration. Solvents were removed by evaporation. The resulting product was a semi-pasty material, devoid of satisfactory surface-active properties. This example illustrates that in order to carry out the process of the present invention, the metal alkyl compound must contain a Group I metal.

*Example 3.—Comparison example*

A charge of 6 grams of lithium aluminum hydride was reacted with 84 grams of 1-dodecene. One hundred milliliters of xylene were added as a reaction solvent. When ethylene oxide was introduced into the reaction, an addition compound of the metal alkyl with the ethylene oxide did not form. Subsequently a catalytic amount of aluminum chloride catalyst was added. However, the desired reaction still did not occur. It thus is apparent that the aluminum chloride must be added to the metal alkyl compound before the alkylene oxide is introduced. More-over, because some reaction between the metal alkyl and the aluminum chloride takes place, a sufficient amount of aluminum chloride should be utilized so that enough remains to serve as a catalyst for the alkylene oxide addition.

*Example 4.—Effect of premature addition of aluminum chloride*

A charge of 50 grams of a mixture of α-olefins (Blend 4A) and 2.5 grams of lithium aluminum hydride were heated together in a xylene solution containing 50 ml. xylene, previously dried over calcium hydride, for a period of about ten minutes, at which time the reaction mixture had reached a temperature of about 80° C. Aluminum chloride in an amount of 0.5 g. was added to the reaction mixture at this point. The reaction was then continued for about five and one-half hours, at which time the heat was turned off. A total of 41.5 g. of ethylene oxide was then added over a period while the temperature was maintained between about 25–130° C.

The reaction product was neutralized with 8.6 g. of 85% phosphoric acid and then steam distilled to remove the xylene. The salts were filtered off, the filter cake extracted with 100 ml. of methanol and refiltered. A white emulsion was formed which foamed strongly. The combined filtrates were evaporated on a rotating evaporator. A residue of 67 g. remained after evaporating the solvents. A small amount of precipitate was removed by filtration to improve the clarity of the product. The product was stripped on a rotating evaporator to remove water. A small amount of an upper layer remained after extensive stripping, apparently due to incomplete reaction of the higher α-olefins. The upper layer formed a milky emulsion in water which did not foam. The lower layer foamed and was soluble in water. The product formed had a hydroxyl number of 112.4, corresponding to an average molecular weight of about 450.

This example illustrates that an incomplete reaction results if the aluminum chloride is added before the α-olefin and the Group I metal-aluminum hydride have completely reacted. For optimum results, the aluminum chloride should not be added until the two ingredients have completely reacted, and prior to the addition of the alkylene oxide.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A process for the production of a nonionic surface-active agent comprised of a cogeneric mixture of polymers which comprises the steps of (1) adding aluminum chloride to a Group I metal-aluminum alkyl, wherein each alkyl group has 4 to 24 carbon atoms, inclusive, in a solvent substantially inert to the reaction, (2) condensing an alkylene oxide having from 2 to 4 carbon atoms with said Group I metal-aluminum alkyl of step (1) in the presence of said aluminum chloride, and (3) hydrolyzing the product of step (2) by mixing and reacting an acid therewith.

2. A process according to claim 1 wherein said Group I metal is lithium.

3. A process according to claim 1, wherein the amount of alkylene oxide added in step (2) is such so that the resulting hydrophilic polyoxyalkylene chain constitutes from about 5% to about 90% of the weight of the product obtained in step (3).

4. A process according to claim 1, wherein the amount of alkylene oxide added in step (2) is such that the resulting hydrophilic polyoxyalkylene chain constitutes at least 40% of the weight of the product obtained in step (3).

5. A process according to claim 1, wherein said alkylene oxide of step (2) is ethylene oxide.

6. A process according to claim 1, wherein said alkylene oxide of step (2) is propylene oxide.

7. A process according to claim 1, wherein said alkylene oxide of step (2) is butylene oxide.

8. A process according to claim 1, wherein the alkyl radicals of said Group I metal-aluminum alkyl each contain at least 8 carbon atoms.

9. A process for the production of a nonionic surface-active agent comprised of a cogeneric mixture of polymers which comprises the steps of (1) adding aluminum chloride to a Group I metal-aluminum alkyl, wherein each alkyl group has 4 to 24 carbon atoms, inclusive, (2) condensing ethylene oxide and another alkylene oxide having from 3 to 4 carbon atoms with the mixture of step (1), and (3) hydrolyzing the product of step (2) by mixing and reacting an acid therewith, wherein a sufficient amount of ethylene oxide is utilized in step (2) so that the oxygen/carbon ratio of the hydrophilic polyoxyalkylene chain formed in the product of step (3) is at least 0.40.

10. A process according to claim 9, wherein said other alkylene oxide is propylene oxide.

11. A process according to claim 9, wherein said Group I metal is lithium.

12. A process according to claim 9, wherein the alkyl groups of said Group I metal-aluminum alkyl each contain at least 8 carbon atoms.

13. A process according to claim 9, wherein said ethylene oxide and said other alkylene oxide are simultaneously condensed together in step (2) with the product of step (1).

14. A process according to claim 9, wherein said ethylene oxide and said other alkylene oxide are sequentially condensed in step (2) with the product of step (1).

15. A process for the production of a nonionic surface-active agent comprised of a cogeneric mixture of polymers which comprises the steps of (1) reacting an α-olefin having 4 to 24 carbon atoms, inclusive, with a Group I metal-aluminum hydride in a solvent substantially inert to the reaction, (2) adding aluminum chloride to the product of step (1), (3) condensing an alkylene oxide having from 2 to 4 carbon atoms with the product of step (2) in the presence of said aluminum chloride, and (4) hydrolyzing the product of step (3) by mixing and reacting an acid therewith.

16. A process according to claim 15, wherein said α-olefin contains at least 8 carbon atoms.

17. A process according to claim 15, wherein said α-olefin is 1-dodecene.

18. A process for the production of a nonionic surface-active agent comprised of a cogeneric mixture of polymers which comprises the steps of (1) reacting an α-olefin having 4 to 24 carbon atoms, inclusive with a Group I metal-aluminum hydride in a solvent substantially inert to the reaction, (2) adding aluminum chloride to the product of step (1), condensing ethylene oxide and another alkylene oxide having from 3 to 4 carbon atoms with the product of step (2) in the presence of said aluminum chloride, and (4) hydrolyzing the product of step (3) by mixing and reacting an acid therewith, wherein a sufficient amount of ethylene oxide is utilized in step (3) so that the oxygen/carbon ratio of the hydrophilic polyoxyalkylene chain formed in the product of step (4) is at least 0.40.

19. A process for the production of a nonionic surface-active agent comprised of a cogeneric mixture of polymers which comprises the steps of (1) reacting 1-dodecene with lithium aluminum hydride, (2) adding aluminum chloride to the product of step (1), (3) condensing ethylene oxide with the product of step (2) in the presence of said aluminum chloride, and (4) hydrolyzing the product of step (3) by mixing and reacting an acid therewith, wherein the amount of ethylene oxide added in step (3) is such that the resulting hydrophilic polyoxyalkylene chain constitutes at least 40% of the weight of the product obtained in step (4).

References Cited by the Examiner

UNITED STATES PATENTS

| | | | |
|---|---|---|---|
| 1,966,488 | 7/1934 | Dorrer et al. | 260—618 |
| 2,839,555 | 6/1958 | Fulton | 260—448 |
| 3,135,706 | 6/1964 | Vandenberg | 260—615 X |

FOREIGN PATENTS

| | | |
|---|---|---|
| 203,149 | 8/1956 | Australia. |
| 785,229 | 10/1957 | Great Britain. |
| 799,955 | 8/1958 | Great Britain. |

LEON ZITVER, *Primary Examiner.*

B. HELFIN, *Examiner.*

H. T. MARS, *Assistant Examiner.*